United States Patent [19]

Brooks

[11] Patent Number: 4,966,871

[45] Date of Patent: Oct. 30, 1990

[54] METHOD FOR VACUUM DRYING THIXOTROPIC AGENTS AND THE RESULTANT LOW MOISTURE THIXOTROPE

[76] Inventor: Lamar E. Brooks, 57 Temple Rd., Wellesley, Mass. 02181

[21] Appl. No.: 321,588

[22] Filed: Mar. 10, 1989

[51] Int. Cl.$^5$ ............................................. C04B 33/30
[52] U.S. Cl. ...................................................... 501/150
[58] Field of Search ........................................ 501/150

[56] References Cited
PUBLICATIONS

Hackh's *Chemical Dictionary*, 5th Edition, p. 60.
Grim, Ralph E., *Clay Mineralogy*, McGraw-Hill, 1953, pp. 114, 154, 345–347, 383.
Haden, W. L., Jr. (Patten, ed.), "Hydrated Magnesium Silicate," *Pigment Handbook*, vol. 1, Wiley-Interscience, 1973, pp. 269–273.

*Primary Examiner*—William R. Dixon, Jr.
*Assistant Examiner*—Deborah Jones

[57] ABSTRACT

A method for producing an attapulgite clay which retains its thixotropic properties, but does not release gases upon being compounded and cured in organic binder systems, such as plastisol. The method involves reducing the moisture content of the attapulgite by heating it under vacuum at an elevated temperature, preferably between 100° C. and 300° C., to preserve its thixotropic properties.

3 Claims, No Drawings

METHOD FOR VACUUM DRYING THIXOTROPIC AGENTS AND THE RESULTANT LOW MOISTURE THIXOTROPE

TECHNICAL FIELD

This invention relates to thixotropic agents and more particularly, but not by way of limitation, to a method of producing attapulgite clays without destroying the thixotropic properties of the clays by reducing the moisture content to a level which permits the clay to be used as a thixotrope in plastisols, adhesive sealants, coatings and other organic binder systems which are heat set or heat cured.

BACKGROUND ART

The production of plastisols, adhesive sealants, coating and other organic binder systems which are heat set or heat cured requires the use of low moisture content thixotropic agents to achieve satisfactory film integrity. Thixotropic agents are used in the production of plastisols and adhesive sealants which are applied to metal or other materials, for example, the coatings found on the wire baskets in a dishwasher or refrigerator. The use of the thixotrope permits the uniform application of the plastisol film to the object which is to be coated and the retention of that relatively uniform film during curing. In heat set (i.e., plastics which cannot be reformed) and heat cured (i.e., plastics which may be reformed by reheating) applications, the moisture content of the plastisols must be low enough to prevent the excessive release of moisture upon heating. Excessive amounts of moisture released during heating can cause bubbles to form in the plastisol coating, which causes reduced film continuity (a coating which contains voids), localized areas where the film does not adhere to the surface coated, and a less desirable appearance.

At present, the mineral asbestos processed by Johns-Manville Corporation, Union Carbide Corporation and others serves as an effective thixotrope for plastisols, adhesive sealants, coatings and other organic binder systems. Thixotropic asbestos is processed to result in low moisture, typically less than 2% free moisture content. Asbestos has been considered a preferred cost effective thixotrope in these applications. Environmental and health considerations, as well as governmental regulations, limit its future and create a need for a suitable substitute thixotrope for use in heat set plastisol formulations and thermoplastic formulations.

Pyrogenic silica such as "CAB-O-SIL" by Cabot Corporation has been used as a substitute thixotrope for asbestos in plastisols, adhesive sealants, and other organic binder systems which are heat set or heat cured. The high cost of pyrogenic silica, however, creates an economic limitation on its use. Further, with time, pyrogenic silica is likely to absorb moisture, reducing its desirability as a thixotrope in, for example, plastisols.

Many clays, notably kaolinite clays, are used extensively as fillers in plastics. In such applications, the clays are used not as a thixotrope, but to achieve reduced shrinkage during curing, to obscure the fiber pattern of glass reinforcement and to increase resistance to chemical action and weathering.

The mineral attapulgite, hydrated magnesium silicate clay, processed by Englehard Company, the Floridian Company and others also serves as an effective thixotrope. Thixotropic attapulgite is widely used as a drilling mud in the drilling of oil wells. As commercially prepared, thixotropic attapulgite contains typically 10% to 15% moisture at 100° C. When used as a thixotropic agent in plastisols, adhesive sealants and other organic binder systems which are heat set or heat cured, undesirable quantities of the moisture contained in typically prepared thixotropic attapulgite is released. When typically prepared attapulgite is used in plastisols, for example, which are heat cured at about 100° C., the moisture in the attapulgite volatilizes and deforms the structure of the plastisol, reducing its film continuity. This moisture release limits or precludes the use of typical attapulgite as a thixotropic agent for most heat set or heat cured applications.

Thixotropic grade attapulgite is processed commercially in carefully controlled drying ovens. The literature teaches that drying temperatures above approximately 400° C. agglomerate the mineral particles and destroy the ability to disperse the clay in the form of colloidally active ultimate particles. The inventor does not know with certainty, but suspects that at this high temperature refluxing of the water back into the clay structure is prevented, causing sintering of the attapulgite.

Bentonite clays treated with amine surfactants can become suitable thixotropic agents when the treated bentonite is mixed with an alcohol, water or other hydroxyl contributing agent by the user. However, bentonite so treated is not a suitable thixotrope for heat set or heat cured plastisols because of the excessive moisture content. Release of the moisture from the treated bentonite clays in heat set or heat cured plastisols results in an undesirable film having a deformed surface, reduced continuity, voids and localized areas of nonadhesion.

Thus, the present invention produces an economical and environmentally safe alternate to the principal thixotropic agent now in use, asbestos.

DISCLOSURE OF THE INVENTION

The present invention may be briefly described as a method for producing a thixotropic grade attapulgite, an attapulgite suitable for use in plastisols, adhesive sealants, coatings and other organic binder systems which are heat set or heat cured. The method comprises drawing a vacuum on the attapulgite and heating it at a temperature sufficient to drive the free moisture from the attapulgite without destroying its thixotropic properties. The thixotropic agent is dried to a desired moisture content and then removed from the vacuum.

The art of compounding plastics is well developed and covers a myriad of possible formulations. In general, a plastic resin, such as polyvinyl chloride, is compounded with plasticizers, fillers and stabilizers. The plastic resin may be one which is heat set or heat cured. The selection of the plasticizer is governed by the properties desired in the final product. Properties commonly affecting plasticizer selection are thermal conductivity, electric conductivity, light stability, color stability, corrosion resistance, flame retardance and flexibility. Plasticizers include dioctyl phthalate, diisooctyl phthalate, diisodecyl phthalate, esters of carboxylic acids or phosphoric acid, polyglycols, ethers and sulfonamides. Stabilizers are used to inhibit degradation of the plastic by oxygen and ultraviolet radiation. Stabilizers include, for example: salicylic acid, 2-hydroxy-benzophenone, lead salts, barium, cadmium, zinc and stearic acid. The strength, durability and color of plastics are varied by the incorporation of fillers such as pigments, clays and glass fibers. Thixotropic agents are added to plastisols and coatings in order to achieve the efficient and uniform application of plastic films during manufacture, for example, in the production of plastic coated wire baskets and shelves in home appliances. The present invention has particular value in plastisols of the following general formula:

| Material | Parts by Weight |
| --- | --- |
| Polyvinyl chloride resin | 100 |
| Dioctyl phthalate | 45–100 |
| Epoxidized oil | 0–5 |
| Octyl epoxy stearate | 0–40 |
| Stabilizer | 1–5 |
| Filler | 0–100 |
| Stearic acid | 0–2 |
| Thixotrope | 2–15 |

The preferred thixotropic agent produced by the present invention is attapulgite which has been vacuum dried at an elevated temperature. The structure of attapulgite, as explained in the literature, is thought to be represented by double silica chains running parallel to one another, with the chains linked together through oxygen atoms at their longitudinal edges to form a kind of double-ribbed sheet. The ribbed sheets are arranged so that the ribbed sheets point together, and the sheets are held together by aluminum and/or magnesium in octahedral coordination between apex oxygens of successive sheets, forming an amphibole chain. Chains of water molecules run parallel to the amphibole chains and fill the interstices between the chains. The cavities will accommodate 4 molecules of water per unit cell, and this zeolitic water (i.e., loosely held in the lattice) would account for the dehydration loss at low temperatures. Attapulgite exhibits a characteristic diffraction spacing of 10.48A which does not change with variations in relative humidity or moderate heating up to about 300° C. Differential thermal curves for attapulgite show an initial endothermic reaction below about 200° C. and additional endothermic reactions at about 225° C. to 350° C., which correspond approximately to the intervals of abrupt water losses shown by the dehydration curves. At 300° C. to 350° C., the ribbons of attapulgite take a tilted position. The original structure may be regained unless heating is continued because attapulgite rehydrates readily. At above 400° C., the fiber length contracts rapidly. This is explained by a closing of the cavities which leads to the disappearance of the water-absorbing property. Attapulgite dried above 400° C. exhibits no thixotropic properties.

It is believed that the invention functions by removing water from attapulgite without disrupting the amphibole chain structure, without losing absorption capacity and without altering thixotropic properties. It is known that when temperature alone is applied to drive off the water under normal atmospheric pressure, the results obtained are: (1) when heated below about 350° C., the water refluxes to the original site upon lowering the temperature or (2) when heated above about 350° C., the moisture content remains lowered and reflux is prevented. It is believed that this results from the collapse of the double-ribbed structure of attapulgite which occurs in the temperature range of 300° C. to 400° C. as described above. As a result, attapulgite cannot be dried under normal atmosphere to a moisture content which is compatible for use in plastisols without destruction of the structure which provides the thixotropic properties. The inventor has found that the thixotropic properties of attapulgite can be preserved and reflux of significant quantities of moisture can be prevented by the drying of attapulgite under a vacuum at temperatures in the range of about 100° C. to 300° C. The inventor would postulate that this process permits the removal of all the zeolitic water without destruction of the double-ribbed structure and that reflux is prevented by removal of all the zeolitic water.

DETAILED DESCRIPTION

The present invention is directed to, although not limited to, the use of thixotropic agents in the application of plastisols, adhesive sealants and coatings which are heat set. For these applications, attapulgite clay is the preferred thixotropic agent because it is readily available commercially, is economical, and produces a viscosity ratio approximating the currently used thixotropic asbestos. The inventor has found that a very desirable thixotropic attapulgite may be effectively produced by placing commercially available thixotropic attapulgite with a moisture content between 10% and 15% in a vacuum oven between approximately 0.08 mm Hg and 0.8 mm Hg at elevated temperatures between approximately 100° C. and 300° C. for a period sufficient to reduce the moisture content of the attapulgite to a desired level, typically below 5% moisture, measured by ASTM D-280-A.

EXAMPLE

Two plastisols having the following compositions were prepared:

TABLE

| Plastisol A | Parts by Wt. | Plastisol B | Parts by Wt. |
| --- | --- | --- | --- |
| Geon 121 | 100 | Geon 121 | 100 |
| Dioctyl Phthalate | 100 | Dioctyl Phthalate | 75 |
| Sympron 1489 | 4 | Paraplex G-62 | 5 |
| Gamasperse 80 | 100 | Nuostable V-1788 | 3 |
| Thixotrope (attapulgite vacuum dried at elevated temperature) | 7 | Thixotrope (attapulgite vacuum dried at elevated temperature) | 10 |

Geon 121 is a trademark for polyvinyl chloride resin by B. F. Goodrich Company. Paraplex G-62 is a trademark for an expoxidized soy bean oil plasticizer by Rohm & Haas. Nuostable V-1788 is a trademark for a metal soap stabilizer of barium, cadmium and zinc by Tenneco Chemical, Inc. Sympron 1489 is a trademark for a barium, cadmium, zinc and phosphate stabilizer. Gamasperse is a trademark of Georgia Marble for a calcium carbonate filler.

First, the thixotrope was prepared by placing typical thixotropic attapulgite clay in a standard laboratory vacuum oven at approximately 0.2 mm Hg and heating the attapulgite at elevated temperatures between 100° C. and 300° C. for a period sufficient to reduce the moisture content to approximately 5%. The time required will vary depending upon quantities of the attapulgite, the size of the vacuum chamber, the amount of vacuum, etc., but in a typical laboratory oven of 1 ft.$^3$, with about 9 pounds of attapulgite held at about 150° C., will be about 30 minutes. The dried attapulgite was removed from the vacuum oven and the viscosity was measured at ambient temperature. A viscosity ratio of approximately 5 was obtained when the viscosity measured with a Brookfield Viscosimeter at 2 rpm is divided by the viscosity measured by the same instrument at 20 rpm. This ratio compares favorably to that of approximately 4 for thixotropic asbestos measured in the same manner. All samples of attapulgite prepared as described above retained their thixotropic character, and moisture did not reflux into the processed attapulgite after removal from the vacuum chamber.

The vacuum dried attapulgite described above was then mixed with the other components of plastisols A and B. Both compositions adhered well when applied to metal and produced satisfactory films when cured. Neither film exhibited discontinuities or bubbles.

Samples of plastisols A and B were prepared using normal thixotropic attapulgite with a moisture content of approximately 12%. All of these samples resulted in undesirable films having visibly observable bubbles in the films.

The invention may also be practiced by combining the attapulgite clay or other thixotropic agents with the plastisol prior to vacuum drying. This method is less desirable, however.

While rather specific terms have been used to describe one embodiment of the present invention, they are not intended nor should they be construed as a limitation upon the invention as defined by the following claims.

I claim:

1. A method for producing a thixotropic attapulgite which comprises the step of heating thixotropic attapulgite in a vacuum from about 0.08 mm Hg to about 0.8 mm Hg at a temperature of between about 100° C. and about 300° C. and for a time sufficient to reduce the moisture content of the attapulgite to from about 2% to about 5%, such that the thixotropic properties of the attapulgite are retained.

2. The method of claim 1, wherein the vacuum is about 0.2 mm Hg.

3. A thixotropic attapulgite prepared by heating said attapulgite in a vacuum from about 0.08 mm Hg to about 0.8 mm Hg at a temperature of between about 100° C. and 300° C. for a time sufficient to reduce the moisture content of the attapulgite to from about 2% to about 5%, such that the thixotropic properties are retained.

* * * * *